US008977426B2

(12) United States Patent
Cawse

(10) Patent No.: US 8,977,426 B2
(45) Date of Patent: Mar. 10, 2015

(54) VIN BASED ACCELEROMETER THRESHOLD

(75) Inventor: Neil Charles Cawse, Oakville (CA)

(73) Assignee: Geotab Inc., Oakville, Ontario (CA)

( * ) Notice: Subject to any disclaimer, the term of this patent is extended or adjusted under 35 U.S.C. 154(b) by 265 days.

(21) Appl. No.: 13/507,085

(22) Filed: Jun. 4, 2012

(65) Prior Publication Data

US 2013/0325250 A1 Dec. 5, 2013

(51) Int. Cl.
*G06F 19/00* (2011.01)

(52) U.S. Cl.
USPC .......... 701/33.1; 701/29.6; 701/32.6; 701/70; 701/79; 701/110; 701/486; 701/502

(58) Field of Classification Search
CPC ...... G07C 5/008; G07C 5/085; G07C 5/0808; G07C 5/0858; G01R 31/007; G01C 25/00; G05B 2219/2637
USPC ..................... 701/29.6, 70, 79, 110, 486, 502
See application file for complete search history.

(56) References Cited

U.S. PATENT DOCUMENTS 6,076,028 A 6/2000 Donnelly et al.
6,185,490 B1 2/2001 Ferguson
7,089,099 B2 * 8/2006 Shostak et al. ............... 701/29.6
7,123,164 B2 * 10/2006 Zoladek et al. .......... 340/870.07
7,158,016 B2 1/2007 Cuddihy et al.
7,421,322 B1 * 9/2008 Silversmith et al. ......... 701/29.6
7,656,280 B2 * 2/2010 Hines et al. ................... 340/438
7,782,181 B2 * 8/2010 Hines et al. ................... 340/438
7,853,375 B2 * 12/2010 Tuff ............................ 701/32.6
2003/0158638 A1 * 8/2003 Yakes et al. ..................... 701/22
2005/0040937 A1 * 2/2005 Cuddihy et al. ............. 340/436
2008/0161989 A1 * 7/2008 Breed ............................ 701/29
2009/0048750 A1 * 2/2009 Breed ............................ 701/70
2009/0055044 A1 * 2/2009 Dienst ............................ 701/32
2009/0228157 A1 * 9/2009 Breed .............................. 701/1
2009/0276115 A1 * 11/2009 Chen .............................. 701/32
2010/0052945 A1 * 3/2010 Breed .......................... 340/903
2010/0141435 A1 * 6/2010 Breed ..................... 340/539.13
2010/0207754 A1 * 8/2010 Shostak et al. ............... 340/450
2010/0228432 A1 * 9/2010 Smith et al. ..................... 701/35
2011/0093162 A1 * 4/2011 Nielsen et al. .................. 701/33
2011/0224865 A1 * 9/2011 Gordon et al. .................. 701/32
2011/0251752 A1 * 10/2011 DeLarocheliere et al. ..... 701/33

* cited by examiner

*Primary Examiner* — Mary Cheung
*Assistant Examiner* — Atul Trivedi
(74) *Attorney, Agent, or Firm* — Derek K.W. Smith

(57) ABSTRACT

A method and apparatus in a vehicular telemetry system for determining accelerometer thresholds based upon decoding a vehicle identification number (VIN).

56 Claims, 9 Drawing Sheets

Establish VIN Based Accelerometer Threshold

Establish Accelerometer Threshold Based Upon A Group Of Specific Vehicles

Set VIN Based Accelerometer Threshold

VIN BASED ACCELEROMETER THRESHOLD

TECHNICAL FIELD OF THE INVENTION

The present invention generally relates to a method and apparatus for application in vehicular telemetry systems. More specifically, the present invention relates to vehicle identification numbers (VIN) and establishing accelerometer thresholds based upon decoding and analyzing a vehicle identification number.

BACKGROUND OF THE INVENTION

Vehicular Telemetry systems are known in the prior art.

U.S. Pat. No. 6,076,028 to Donnelly et al is directed to an automatic vehicle event detection, characterization and reporting. A processor processes accelerometer data from a vehicle over varying length windows of time to detect and characterize vehicle events such as crashes. The processed data is compared to thresholds to detect and characterize events. Such evens are then reported to a dispatch center using wireless communications and providing vehicle location information. The dispatch center contacts the public safety answering points necessary to provide services to the vehicle.

U.S. Pat. No. 6,185,490 to Ferguson is directed to a vehicle crash data recorder. A vehicle data recorder useful in recording and accessing data from a vehicle accident comprised of a microprocessor based system that will have in a preferred embodiment four inputs from the host vehicle, and four inputs from the internal sensors. The apparatus is arranged with a three-stage memory to record and retain the information and is equipped with a series and parallel connectors to provide instant on scene access to the accident data. This invention includes a plurality of internally mounted devices necessary to determine vehicle direction, rollover detection, and impact forces. The plurality of inputs from the host vehicle include in the preferred embodiment, the speed of the vehicle, seat belt use, brake activation, and whether or not the transmission is in forward or reverse gear.

U.S. Pat. No. 7,158,016 to Cuddihy et al is directed to a crash notification system for an automotive vehicle. The system is used to communicate with a communication network and ultimately to a response center. The system within vehicle includes an occupant sensor that generates an occupant sensor status signal. A crash sensor, vehicle identification number memory, or a vertical acceleration sensor may also be used to provide information to the controller. The controller generates a communication signal that corresponds to the occupant sensor status signal and the other information so that appropriate emergency personnel may be deployed.

SUMMARY OF THE INVENTION

The present invention is directed to aspects in a vehicular telemetry system and provides a new capability for establishing accelerometer thresholds.

According to a first broad aspect of the invention, there is a method of determining a VIN based accelerometer threshold for a vehicular telemetry system. The method includes the steps of receiving a VIN, decoding the VIN to identify vehicle components, and determining the accelerometer threshold based upon the vehicle components.

The method may also include the step of analyzing the vehicle component. In an embodiment of the invention, decoding the VIN decodes a first group. In another embodiment of the invention, decoding the VIN decodes a second group. In another embodiment of the invention, the first group includes at least one vehicle component of a platform, model, body style, or engine type. In another embodiment of the invention, a weight is associated with each of the at least one component. In another embodiment of the invention, an accelerometer threshold is associated with a sum of weight of all components. In another embodiment of the invention, the second group includes at least one component of installed options, engine, or transmission. In another embodiment of the invention, a weight is associated with at least one component. In another embodiment of the invention, an accelerometer threshold is associated with a sum of weight of all components. The method may further include the step of saving a digital record of the VIN and the VIN based accelerometer threshold. The method may further include the step of providing the VIN based accelerometer threshold from the digital record upon request. In another embodiment of the invention, the analyzing vehicle component associates a weight with each of the vehicle components. In another embodiment of the invention, sensitivity is associated with a sum of weight of the vehicle components. In another embodiment of the invention the VIN based accelerometer threshold is determined based upon a sum of weight of the vehicle components. In another embodiment of the invention, if the accelerometer is over reading or under reading for a VIN, refine the VIN based accelerometer threshold and update the digital record of the VIN with a refined VIN based accelerometer threshold.

According to a second broad aspect of the invention, there is a method of setting a VIN based accelerometer threshold in a vehicular telemetry system. The method includes the steps of receiving a VIN, if a VIN based accelerometer threshold is available for the VIN, set the VIN based accelerometer threshold in the vehicular telemetry system. If a VIN based accelerometer threshold is not available for the VIN, set the VIN based accelerometer threshold by decoding the VIN.

In an embodiment of the invention, decoding the VIN includes determining vehicle components from the VIN and determining a weight of the vehicle components. In another embodiment of the invention, the VIN based accelerometer threshold is determined by a sum of weight of the vehicle components. In another embodiment of the invention, the vehicle components include a first group. In another embodiment of the invention, the vehicle components include a second group. In another embodiment of the invention, the Vin based accelerometer threshold includes a range of weight of the vehicle components.

According to a third broad aspect of the invention, there is an apparatus for setting a VIN based accelerometer threshold in a vehicular telemetry system including a microprocessor, memory, and accelerometer, and an interface to a vehicle network communication bus. The microprocessor for communication with the accelerometer and for communication with the interface to the vehicle network communication bus. The microprocessor and memory for receiving a VIN from the interface to the vehicle network communication bus. The microprocessor and memory determining if a VIN based accelerometer threshold is available for the VIN and capable of setting the VIN based accelerometer threshold. The microprocessor and memory determining if a VIN based accelerometer threshold is not available for the VIN and setting the VIN based accelerometer threshold by decoding the VIN.

In an embodiment of the invention, the microprocessor and memory capable for decoding the VIN into vehicle components. In another embodiment of the invention, the microprocessor and memory further capable for determining a weight of the vehicle components. In another embodiment of the invention, the microprocessor and memory further capable for determining the VIN based accelerometer threshold based upon a weight of the vehicle components. In an embodiment of the invention, the microprocessor and memory further capable for determining the VIN based accelerometer threshold based upon a range of weight of the vehicle components. In another embodiment of the invention, the interface to the vehicle network communication bus is an electronic interface, for example a cable. In an embodiment of the invention, the interface to a vehicle network communication bus is a telecommunication signal interface, for example Wi-Fi or Bluetooth.

According to a fourth broad aspect of the invention, there is a method of setting a VIN based accelerometer threshold in a vehicular telemetry system. The method includes the steps of receiving VIN data in a vehicular system, creating a first message in the vehicular system and sending the first message to a remote system requesting an accelerometer threshold with the VIN data. Receiving in a remote system the first message requesting an accelerometer threshold with the VIN data. Creating a second message in the remote system and sending the second message providing the VIN based accelerometer threshold based upon the VIN data to the vehicular system. Receiving the second message providing the VIN based accelerometer threshold in the vehicular system and setting the accelerometer threshold.

In an embodiment of the invention, the remote system determines from a digital record if a VIN based accelerometer threshold is available for the VIN data. In another embodiment of the invention, the remote system determines a VIN based accelerometer threshold by decoding the VIN data. In another embodiment of the invention, decoding the VIN data determines vehicle components from the VIN data. In another embodiment of the invention, the vehicle components are associated with weight. In another embodiment of the invention, the VIN based accelerometer threshold is determined based upon a weight of the vehicle components. In another embodiment of the invention, the remote system determines a VIN base accelerometer threshold from a digital record.

According to a fifth broad aspect of the invention, there is an apparatus for setting a VIN based accelerometer threshold in a vehicular telemetry system including a vehicular system and a remote system. The vehicular system for receiving VIN data, the vehicular system for creating a first message and sending the first message to the remote system requesting an accelerometer threshold with the VIN data. The remote system for receiving the first message requesting an accelerometer threshold with the VIN data, the remote system for creating a second message providing the VIN based accelerometer threshold based upon the VIN data and sending the second message to the vehicular system and the vehicular system for receiving the second message providing the VIN based accelerometer threshold in the vehicular system and setting the accelerometer threshold.

In an embodiment of the invention, the remote system determines a VIN based accelerometer threshold by decoding the VIN data. In another embodiment of the invention, the remote system determines a VIN based accelerometer threshold by decoding the VIN data into groups. In another embodiment of the invention, the decoding the VIN data determines vehicular components from the VIN data. In another embodiment of the invention, the vehicle components are associated with weight. In another embodiment of the invention, the VIN based accelerometer threshold is determined based upon a sum of weight of the vehicle components. In another embodiment of the invention, the remote system determines a VIN based accelerometer threshold from a digital record. In another embodiment of the invention, the remote system is a server. In another embodiment of the invention, the remote system is a computer. In another embodiment of the invention, the remote system is a hand held device.

According to a sixth broad aspect of the invention, there is a method of setting a VIN based accelerometer threshold in a vehicular telemetry system. The method includes the steps of creating a first message in a remote system and sending the first message to a vehicular system requesting VIN data. Receiving the first message in the vehicular system, the vehicular system obtaining VIN data, creating and sending a second message with VIN data to the remote system. Receiving the second message with the VIN data in the remote system, creating a third message in the remote system and sending the third message to the vehicular system with the VIN based accelerometer threshold. Receiving the third message with the VIN based accelerometer threshold in the vehicular system setting the accelerometer threshold in the vehicular system.

The method may include the step of determining in the remote system if a VIN based accelerometer threshold is available for the VIN data. The method may include the step of determining in the remote system a VIN based accelerometer threshold by decoding the VIN data. In an embodiment of the invention, decoding the VIN data determines vehicle components from the VIN data. In another embodiment of the invention, the vehicle components area associated with weight. In another embodiment of the invention, the VIN based accelerometer threshold is determined based upon a sum of weight of the vehicle components. The method may include the step of determining in the remote system a VIN based accelerometer threshold from a digital record.

According to a seventh broad aspect of the invention, there is an apparatus for setting a VIN based accelerometer threshold in a vehicular telemetry system including a vehicular system and a remote system. The remote system for creating a first message and sending the first message to the vehicular system requesting VIN data. The vehicular system receiving the first message, the vehicular system obtaining VIN data for creating and sending a second message with VIN data to the remote system. The remote system for receiving the second message with VIN data fore creating a third message and sending the third message to the vehicular system with the VIN based accelerometer threshold. The vehicular system for receiving the third message with the VIN based accelerometer threshold and the vehicular system setting the accelerometer threshold.

In an embodiment of the invention, the remote system further determines if a VIN based accelerometer threshold is available for the VIN data. In another embodiment of the invention, the remote system further determines a VIN based accelerometer threshold by decoding the VIN data. In another embodiment of the invention, the remote system determines vehicle components from the VIN data. In another embodiment of the invention, the vehicle components area associated with weight. In another embodiment of the invention, the VIN based accelerometer threshold is determined based upon a weight of the vehicle components. In another embodiment of the invention, the remote system further determines a VIN based accelerometer threshold from a digital record.

These and other aspects and features of non-limiting embodiments are apparent to those skilled in the art upon review of the following detailed description of the non-limiting embodiments and the accompanying drawings.

BRIEF DESCRIPTION OF THE DRAWINGS

Exemplary non-limiting embodiments of the present invention are described with reference to the accompanying drawings in which.

The drawings are not necessarily to scale and may be diagrammatic representations of the exemplary non-limiting embodiments of the present invention.

DETAILED DESCRIPTION

Telematic Communication System

Figure 1:
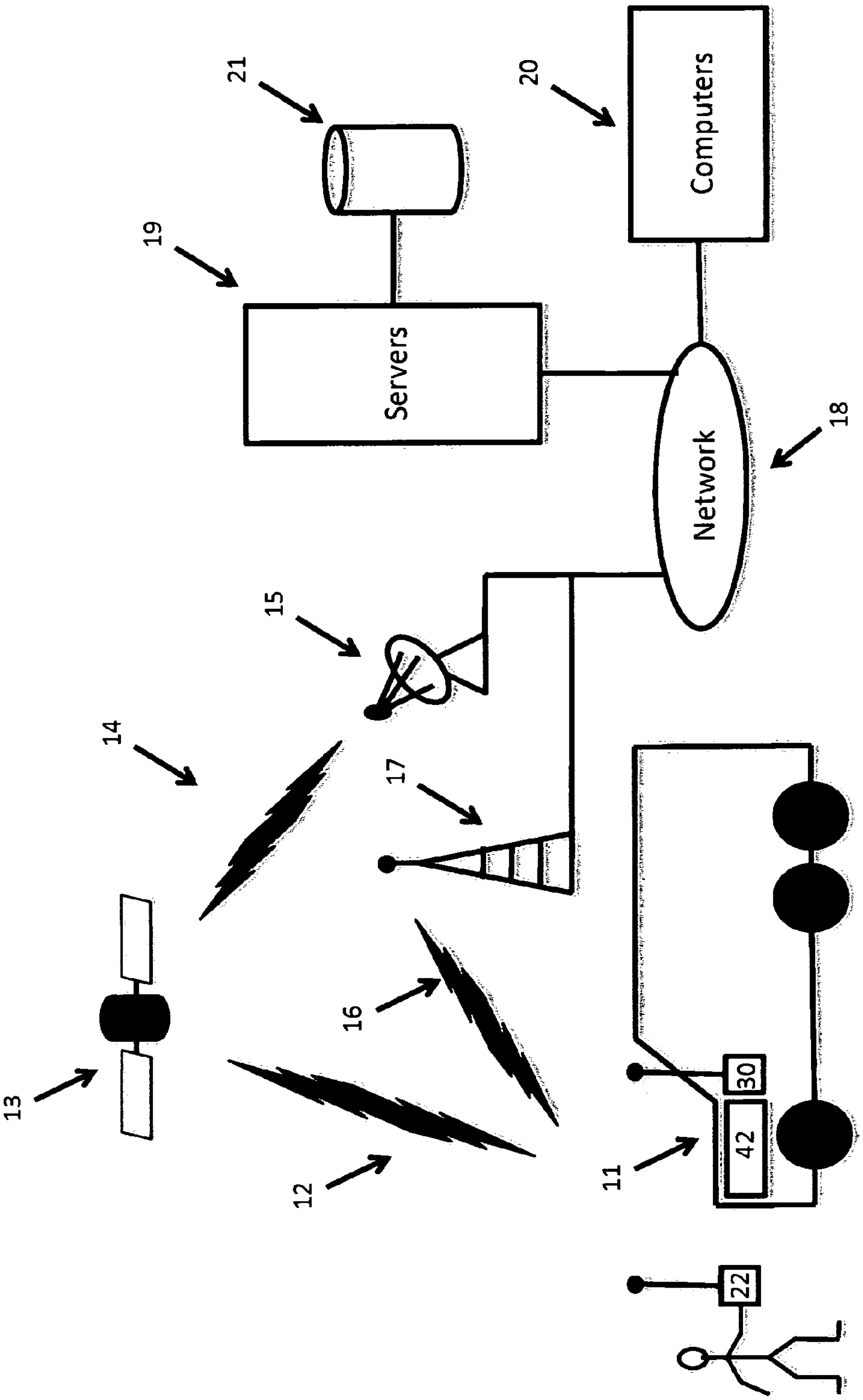
FIG. 1 is a high level diagrammatic view of a vehicular telemetry communication system.

Referring to FIG. 1 of the drawings, there is illustrated a high level overview of a telematic communication system. There is at least one vehicle generally indicated at 11. The vehicle 11 includes a vehicular telemetry hardware system 30 and a resident vehicle portion 42.

The telematic communication system provides communication and exchange of data, information, commands, and messages between components in the system such as at least one server 19, at least one computer 20, at least one hand held device 22, and at least one vehicle 11.

In one example, the communication 12 is to/from a satellite 13. The vehicle 11, or hand held device 22 communicates with the satellite 13 that communicates with a ground-based station 15 that communicates with a computer network 18. In an embodiment of the invention, the vehicular telemetry hardware system 30 and the remote site 44 facilitates communication 12 to/from the satellite 13.

In another example, the communication 16 is to/from a cellular network 17. The vehicle 11, or hand held device 22 communicates with the cellular network 17 connected to a computer network 18. In an embodiment of the invention, communication 16 to/from the cellular network 17 is facilitated by the vehicular telemetry hardware system 30 and the remote site 44.

Computer 20 and server 19 communicate over the computer network 18. The server 19 may include a database 21 of vehicle identification numbers and VIN based accelerometer thresholds associated with the vehicle identification numbers. In an embodiment of the invention, a telematic application software runs on a server 19. Clients operating a computer 20 communicate with the application software running on the server 19.

In an embodiment of the invention, data, information, commands, and messages may be sent from the vehicular telemetry hardware system 30 to the cellular network 17, to the computer network 18, and to the servers 19. Computers 20 may access the data and information on the servers 19. Alternatively, data, information, commands, and messages may be sent from the servers 19, to the network 18, to the cellular network 17, and to the vehicular telemetry hardware system 30.

In another embodiment of the invention, data, information, commands, and messages may be sent from vehicular telemetry hardware system to the satellite 13, the ground based station 15, the computer network 18, and to the servers 19. Computers 20 may access data and information on the servers 19. In another embodiment of the invention, data, information, commands, and messages may be sent from the servers 19, to the computer network 18, the ground based station 15, the satellite 13, and to a vehicular telemetry hardware system.

Data, information, commands, and messages may also be exchanged through the telematics communication system and a hand held device 22.

Vehicular Telemetry Hardware System

Figure 2:
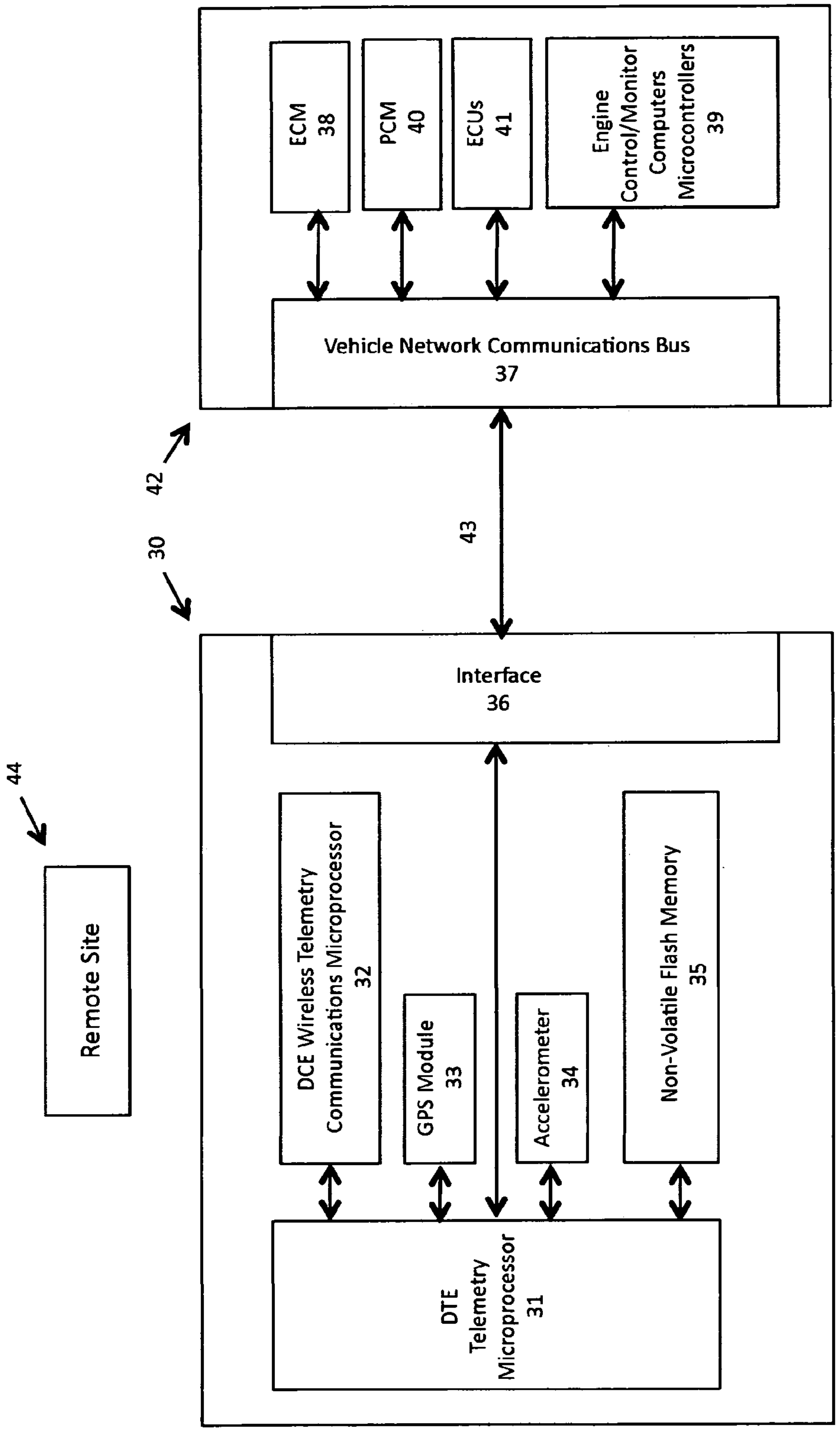
FIG. 2 is diagrammatic view of an vehicular telemetry hardware system including an on-board portion and a resident vehicular portion.

Referring now to FIG. 2 of the drawings, there is illustrated a vehicular telemetry hardware system generally indicated at 30. The on-board portion generally includes: a DTE (data terminal equipment) telemetry microprocessor 31; a DCE (data communications equipment) wireless telemetry communications microprocessor 32; a GPS (global positioning system) module 33; an accelerometer 34; a non-volatile flash memory 35; and provision for an OBD (on board diagnostics) interface 36 for connection 43 and communicating with a vehicle network communications bus 37.

The resident vehicular portion 42 generally includes: the vehicle network communications bus 37; the ECM (electronic control module) 38; the PCM (power train control module) 40; the ECUs (electronic control units) 41; and other engine control/monitor computers and microcontrollers 39.

While the system is described as having an on-board portion 30 and a resident vehicular portion 42, it is also understood that the present invention could be a complete resident vehicular system or a complete on-board system. In addition, in an embodiment of the invention, a vehicular telemetry system includes a vehicular system and a remote system. The vehicular system is the vehicular telemetry hardware system 30. The vehicular telemetry hardware system 30 is the on-board portion 30 and may also include the resident vehicular portion 42. In further embodiments of the invention the remote system may be one or all of the server 19, computer 20, and hand held device 22.

In an embodiment of the invention, the DTE telemetry microprocessor 31 includes an amount of internal flash memory for storing firmware to operate and control the overall system 30. In addition, the microprocessor 31 and firmware log data, format messages, receive messages, and convert or reformat messages. In an embodiment of the invention, an example of a DTE telemetry microprocessor 31 is a PIC24H microcontroller commercially available from Microchip Corporation.

The DTE telemetry microprocessor 31 is interconnected with an external non-volatile flash memory 35. In an embodiment of the invention, an example of the flash memory 35 is a 32 MB non-volatile flash memory store commercially available from Atmel Corporation. The flash memory 35 of the present invention is used for data logging.

The DTE telemetry microprocessor 31 is further interconnected for communication to the GPS module 33. In an embodiment of the invention, an example of the GPS module 33 is a Neo-5 commercially available from u-blox Corporation. The Neo-5 provides GPS receiver capability and functionality to the vehicular telemetry hardware system 30.

The DTE telemetry microprocessor is further interconnected with the OBD interface 36 for communication with the vehicle network communications bus 37. The vehicle network communications bus 37 in turn connects for communication with the ECM 38, the engine control/monitor computers and microcontrollers 39, the PCM 40, and the ECU 41.

The DTE telemetry microprocessor has the ability through the OBD interface 36 when connected to the vehicle network communications bus 37 to monitor and receive vehicle data and information from the resident vehicular system components for further processing.

As a brief non-limiting example of vehicle data and information, the list may include: vehicle identification number (VIN), current odometer reading, current speed, engine RPM, battery voltage, engine coolant temperature, engine coolant level, accelerator peddle position, brake peddle position, various manufacturer specific vehicle DTCs (diagnostic trouble codes), tire pressure, oil level, airbag status, seatbelt indication, emission control data, engine temperature, intake manifold pressure, transmission data, braking information, and fuel level. It is further understood that the amount and type of vehicle data and information will change from manufacturer to manufacturer and evolve with the introduction of additional vehicular technology.

The DTE telemetry microprocessor 31 is further interconnected for communication with the DCE wireless telemetry communications microprocessor 32. In an embodiment of the invention, an example of the DCE wireless telemetry communications microprocessor 32 is a Leon 100 commercially available from u-blox Corporation. The Leon 100 provides mobile communications capability and functionality to the vehicular telemetry hardware system 30 for sending and receiving data to/from a remote site 44. Alternatively, the communication device could be a satellite communication device such as an Iridium™ device interconnected for communication with the DTE telemetry microprocessor 31. Alternatively, there could be a DCE wireless telemetry communications microprocessor 32 and an Iridium™ device for satellite communication. This provides the vehicular telemetry hardware system 30 with the capability to communicate with at least one remote site 44.

In embodiments of the invention, a remote site 44 could be another vehicle 11 or a base station or a hand held device 22. The base station may include one or more servers 19 and one or more computers 20 connected through a computer network 18 (see FIG. 1). In addition, the base station may include computer application software for data acquisition, analysis, and sending/receiving commands, messages to/from the vehicular telemetry hardware system 30.

The DTE telemetry microprocessor 31 is further interconnected for communication with an accelerometer (34). An accelerometer (34) is a device that measures the physical acceleration experienced by an object. Single and multi-axis models of accelerometers are available to detect the magnitude and direction of the acceleration, or g-force, and the device may also be used to sense orientation, coordinate acceleration, vibration, shock, and falling.

In an embodiment of the invention, an example of a multi-axis accelerometer (34) is the LIS302DL MEMS Motion Sensor commercially available from STMicroelectronics. The LIS302DL integrated circuit is an ultra compact low-power three axes linear accelerometer that includes a sensing element and an IC interface able to take the information from the sensing element and to provide the measured acceleration data to other devices, such as a DTE Telemetry Microprocessor (31), through an I2C/SPI (Inter-Integrated Circuit) (Serial Peripheral Interface) serial interface. The LIS302DL integrated circuit has a user-selectable full scale range of +−2 g and +−8 g, programmable thresholds, and is capable of measuring accelerations with an output data rate of 100 Hz or 400 Hz.

The vehicular telemetry hardware system 30 receives data and information from the resident vehicular portion 42, the GPS module 33, and the accelerometer 43. The data and information is stored in non-volatile flash memory 35 as a data log. The data log may be further transmitted by the vehicular telemetry hardware system 30 over the vehicular telemetry communication system to the server 19 (see FIG. 1). The transmission may be controlled and set by the vehicular telemetry hardware system 30 at pre-defined intervals. The transmission may also be triggered as a result of a events such as a harsh event or an accident. The transmission may further be requested by a command sent from the application software running on the server 19.

Accelerometer Thresholds

In order for the accelerometer and system to monitor and determine events, the system requires a threshold, or thresholds, to indicate events such as harsh acceleration, harsh cornering, harsh breaking, or accidents. However, these thresholds depend in part upon the weight of the vehicle. A heavier vehicle would have a different accelerometer threshold from a lighter vehicle.

For example, a cargo van may weigh 2500 pounds, a cube van may weigh 5000 pounds, a straight truck may weight 15,000 pounds and a tractor-trailer may weight 80,000 pounds. Furthermore, depending upon the platform, model, configuration and options, a particular class or type of vehicle may also have a range of weights.

If the accelerometer threshold is set either too high or low for a particular vehicle weight, then the accelerometer may either over read or under read for a given event resulting in either missing an event or erroneously reporting an event.

Table 1 illustrates by way of example, a number of different thresholds relating to different aspects of a harsh event such as accelerations, braking, and cornering. There are also different sensitivities, or a graduation associated with the threshold values to include low sensitivity, medium sensitivity, and high sensitivity. These sensitivities in turn relate to a range of vehicle weights.

TABLE 1

Example thresholds for harsh events with different sensitivities.

| Aspect Of Event | Significant Event Type | Accelerometer Data | Range |
|---|---|---|---|
| High Sensitivity | Harsh Acceleration | Forward or Braking | (3.52, 90) |
| | Harsh Braking | Forward or Braking | (−90, −3.88) |
| | Harsh Corning (Left) | Side to Side | (3.88, 90) |
| | Harsh Corning (Right) | Side to Side | (−90, −3.88) |
| Medium Sensitivity | Harsh Acceleration | Forward or Braking | (4.41, 90) |
| | Harsh Braking | Forward or Braking | (−90, −4.76) |
| | Harsh Corning (Left) | Side to Side | (4.76, 90) |
| | Harsh Corning (Right) | Side to Side | (−90, −4.76) |
| Low Sensitivity | Harsh Acceleration | Forward or Braking | (5.29, 90) |
| | Harsh Braking | Forward or Braking | (−90, −5.64) |
| | Harsh Corning (Left) | Side to Side | (5.64, 90) |
| | Harsh Corning (Right) | Side to Side | (−90, −5.64) |

Therefore, as illustrated by table 1, the threshold values and sensitivity may be associated with a range of vehicle weights. In an embodiment of the invention, the accelerometer threshold values may be for a single axis accelerometer. In another embodiment of the invention, the accelerometer threshold values may be for a multi-axis accelerometer.

Vehicle Identification Number (VIN)

A vehicle identification number, or VIN, is a unique serial number used in the automotive industry to identify individual vehicles. There are a number of standards used to establish a vehicle identification number, for example ISO 3779 and ISO 3780 herein incorporated by reference. As illustrated in Table 2, an example vehicle identification number may be composed of three sections to include a world manufacturer identifier (WMI), a vehicle descriptor section (VDS), and a vehicle identifier section (VIS).

Vehicle Identification Number Decoding and Analysis

Figure 3:
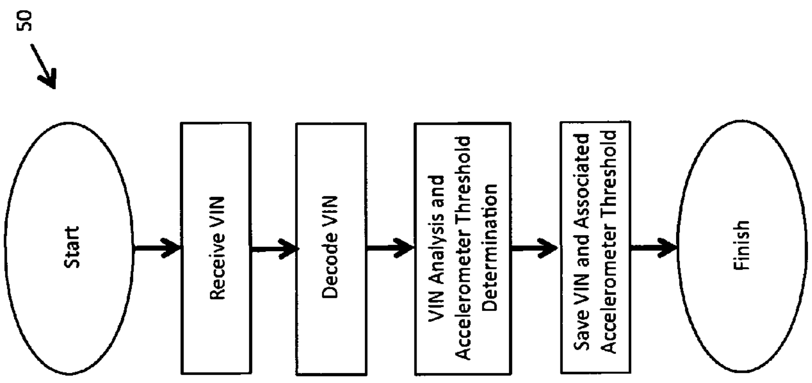
FIG. 3 is a high level flow chart for establishing a VIN based accelerometer threshold.

A non-limiting vehicle identification number decoding and analysis example will be explained with reference to Table 3 and FIG. 3. The method to establish a VIN based accelerometer threshold is generally indicated at 50. The example includes information associated with a vehicle identification number (VIN) to include a world manufacturer identifier (WMI) field, vehicle descriptor section (VDS) field, and vehicle identifier section (VIS) field.

TABLE 2

Composition of VIN

| Standard | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| ISO 3779 | | WMI | | | | VDS | | | | | | | VIS | | | | |
| European Union and North America more than 500 vehicles per year | | WMI | | | | Vehicle Attributes | | | Check Digit | Model Year | Plant Code | | Sequential Number | | | | |
| European union and North America less than 500 vehicles per year | | WMI | | | | Vehicle Attributes | | | Check Digit | Model Year | Plant Code | | Manufacturer Identifier | | | Sequential Number | |

The world manufacturer identifier field has three bits (0-2) of information that identify the manufacturer of the vehicle. The first bit identifies the country where the vehicle was manufactured. For example, a 1 or 4 indicates the United States, a 2 indicates Canada, and a 3 indicates Mexico. The second bit identifies the manufacturer. For example, a "G" identifies General Motors and a "7" identifies GM Canada. The third bit identifies the vehicle type or manufacturing division.

As a further example using the first three bits, a value of "1GC" indicates a vehicle manufactured in the United States by General Motors as a vehicle type of a Chevrolet truck.

The vehicle descriptor section field has five bits of information (3-7) for identifying the vehicle type. Each manufacturer has a unique system for using the vehicle descriptor section field and it may include information on the vehicle platform, model, body style, engine type, model, or series.

The eighth bit is a check digit for identifying the accuracy of a vehicle identification number.

Within the vehicle identifier section field, bit 9 indicates the model year and bit 10 indicates the assembly plant code. The vehicle identifier section field also has eight bits of information (11-16) for identifying the individual vehicle. The information may differ from manufacturer to manufacturer and this field may include information on options installed, or engine and transmission choices.

The last four bits are numeric and identify the sequence of the vehicle for production as it rolled off the manufacturers assembly line. The last four bits uniquely identify the individual vehicle.

While the vehicle identification number has been described by way of example to standards, not all manufacturers follow standards and may have a unique composition for vehicle identification. In this case, a vehicle identification number could be analyzed to determine the composition and makeup of the number.

TABLE 3

Example Record of Vin Information.
VIN Information and Data

| | | | |
|---|---|---|---|
| WMI Field | Manufacturer | | A |
| VDS Field | Vehicle Type | Platform | P1 |
| | | | P2 |
| | | Model | M1 |
| | | | M2 |
| | | | M3 |
| | | Body Style | BS1 |
| | | | BS2 |
| | | Engine Type | E1 |
| | | | E2 |
| VIS Field | Individual Vehicle | Installed Options | OPT1 |
| | | | OPT2 |
| | | | OPT3 |
| | | | OPT4 |
| | | | OPT5 |
| | | Engine | EA |
| | | | EB |
| | | Transmission | TA |
| | | | TB |

The vehicle identification number is received and may be decoded to identify vehicle components such as various characteristics, configurations, and options of a particular vehicle. In this example, the manufacturer has two types of platform, three models, two body styles, four engines, five options, and two transmissions that may be combined to provide a particular vehicle.

Figure 5:
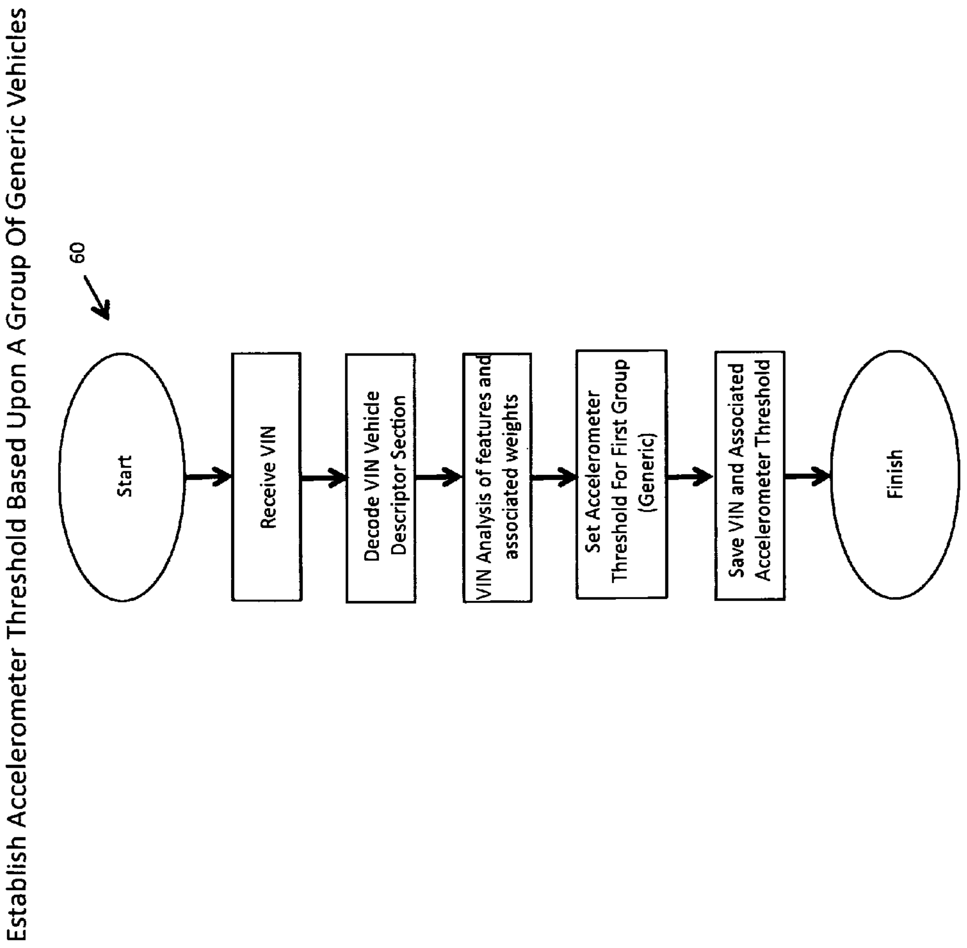
FIG. 5 is a high level flow chart for establishing a VIN based accelerometer threshold based upon a group of generic vehicles.
Figure 6:
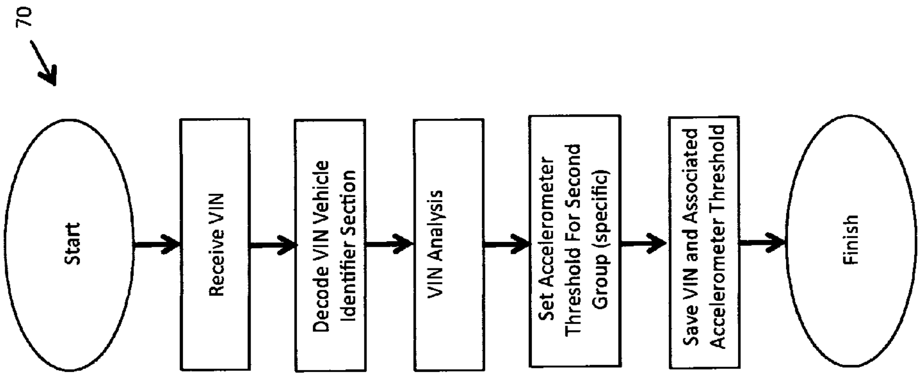
FIG. 6 is a high level flow chart for establishing a VIN based accelerometer threshold based upon a group of specific vehicles.

By way of a non-limiting example and reference to Table 3, an example VIN may be decoded as follows:

from the WMI field, to be manufacturer A, from the VDS field, Platform P2, Model M2, Body Style BS2 and Engine Type E2, from the VIS field, Installed Options OPT1 and OPT5, Engine EA and Transmission TB The decoded information from the VDS field may be provided as a first group of vehicle information (see FIG. 5, establishing accelerometer threshold based upon a group of generic vehicles is generally indicated at 60). In an embodiment of the invention, the first group of vehicle information is a generic type of vehicle for setting a generic VIN based accelerometer threshold. The decoded information from the VIS field may be provided as a second group of vehicle information (see FIG. 6, establishing accelerometer threshold based upon a group of specific vehicles is generally indicated at 70). The second group of vehicle information is a specific type of vehicle for setting a specific VIN based accelerometer threshold. In another embodiment of the invention, the decoded information is provided as a third group of vehicle information including both the first and second group of information.

The vehicle identification number analysis and accelerometer threshold determination may occur in a number of ways. In an embodiment of the invention, weight or mass of the vehicle and each vehicle components could be used. A basic weight of the vehicle could be determined from the vehicle identification number by associating individual weights with the individual vehicle components such as platform, model, body style, engine type, transmission type, and installed options. Then, by adding up the component weights based upon a decoded vehicle identification number for the particular vehicle, you calculate a basic weight of the vehicle. The basic weight of the vehicle could be a first group basic weight, a second group basic weight, or a third group basic weight.

Once a basic weight of the vehicle has been determined, than an associated, or assigned VIN based accelerometer threshold may be determined based upon the basic weight of the vehicle for example, assigning a medium sensitivity set of thresholds (see Table 1).

In another embodiment of the invention, accelerometer thresholds could be directly assigned for configurations of the vehicle identification number. For example, a known accelerometer threshold for a known vehicle could be assigned to the vehicle identification number as a VIN based accelerometer threshold. Then, the vehicle identification number could be decoded into the vehicle components to associate the vehicle components with the accelerometer threshold.

Once a VIN based accelerometer threshold is assigned to a vehicle identification number, then this VIN based accelerometer threshold could be used for all vehicles with a first group of vehicle information (generic). Alternatively, a unique VIN based accelerometer threshold could be assigned to a vehicle with a second group of vehicle information (specific).

Once the vehicle identification number has been decoded, analyzed, and a VIN based accelerometer threshold has been assigned, the information may be saved as a digital record for future or subsequent use as VIN data and information. The VIN data and information digital record may include the vehicle identification number, corresponding weights for vehicle components, group (first, second, third), and the VIN based accelerometer threshold or refined VIN based accelerometer threshold (to be described). The digital record may be stored on a server 19, in a database 21, a computer 20 a hand held device 22, or a vehicular telemetry hardware system 30.

Figure 4:
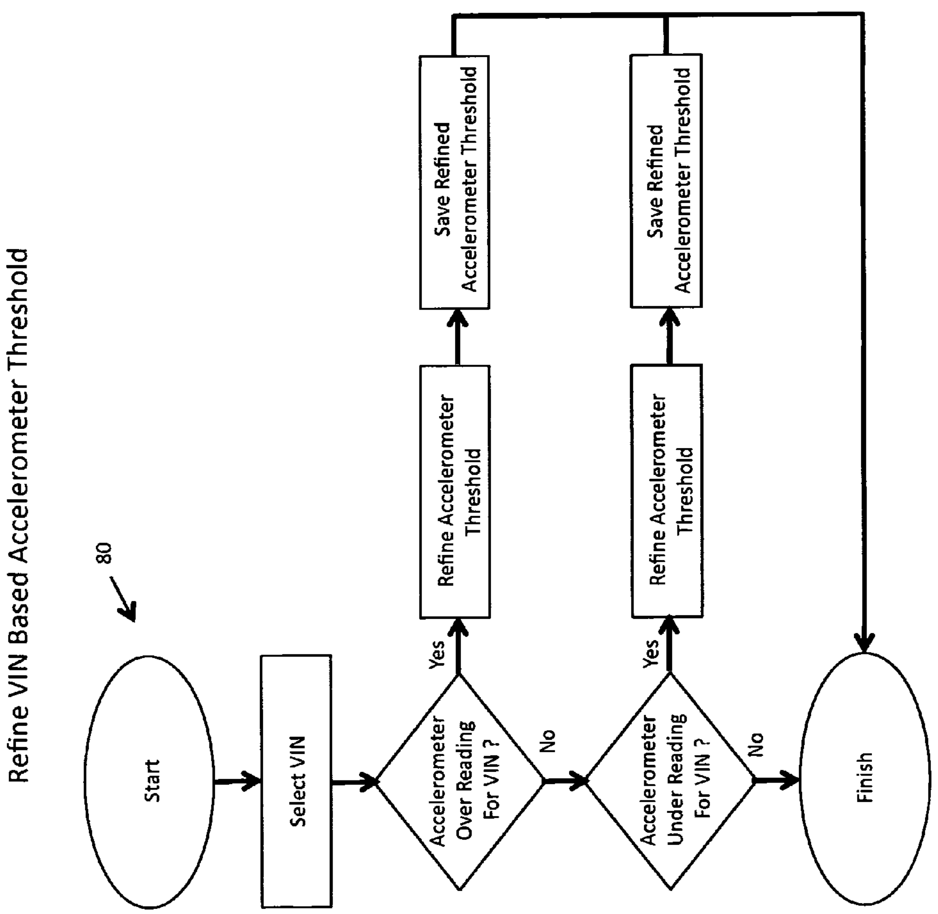
FIG. 4 is a high level flow chart for refining a VIN based accelerometer threshold

Refining or adjusting the VIN based accelerometer threshold is described with reference to FIG. 4 and generally indicated at 80. A VIN based accelerometer threshold has been assigned to a vehicle identification number and saved as a digital record. The vehicle identification number is selected and the digital record is retrieved.

For the case where the VIN based accelerometer threshold has been determined to be over reading giving erroneous indications of events, the VIN based accelerometer threshold is refined or adjusted in sensitivity (see table 1) and the new value (or values) is saved with the digital record. For the case where the VIN based accelerometer threshold has been determined to be under reading giving erroneous indications of events, the VIN based accelerometer threshold is refined or adjusted in sensitivity as well (see table 1) and the new value (or values) is saved with the digital record.

In addition, where the VIN based accelerometer threshold relates to a first group or generic type of vehicle, then application software could perform an additional digital record update of VIN based accelerometer thresholds to all vehicle identification numbers in the first group. Alternatively if there is a fleet of identical specific vehicles, then application software could perform an additional digital record update of VIN based accelerometer thresholds to all vehicle identification numbers in the second group.

Setting a VIN Based Accelerometer Threshold

The DTE telemetry microprocessor 31, firmware computer program, and memory 35 include the instructions, logic, and control to execute the portions of the method that relate to the vehicular telemetry hardware system 30. The microprocessor, application program, and memory on the server 19, or the computer, or the hand held device 22 include the instructions, logic, and control to execute the portions of the method that relate to the remote site 44. The server 19 also includes access to a database 21. The database 21 includes a plurality of digital records of VIN data and information.

Figure 7:
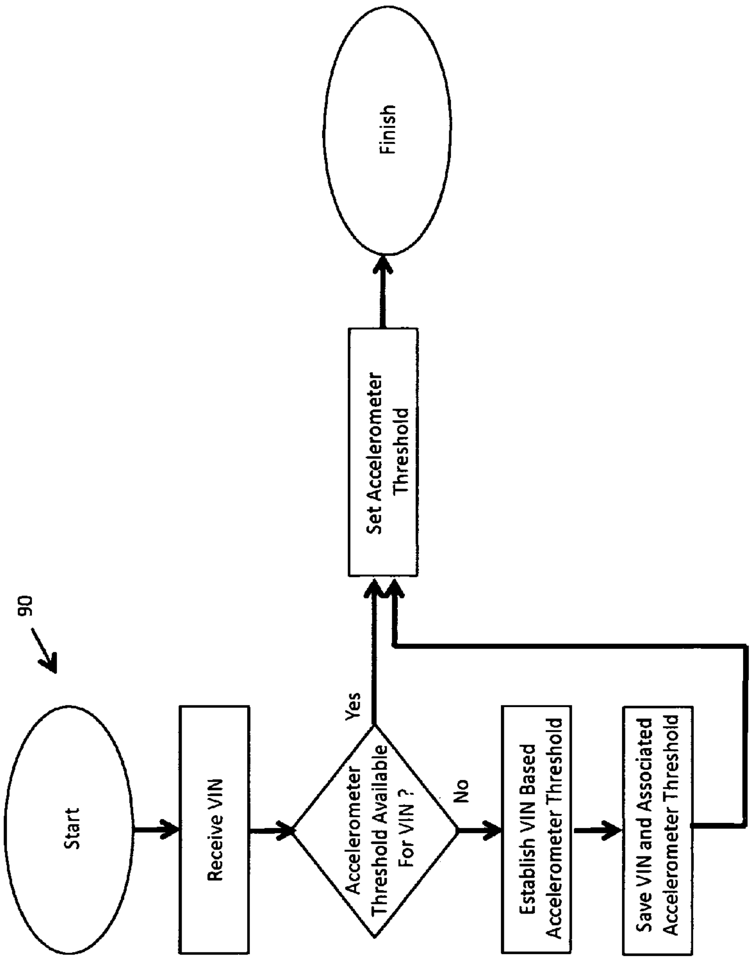
FIG. 7 is a high level flow chart for setting a VIN based accelerometer threshold.

Referring now to FIGS. 1 and 7, an embodiment of the invention is described to set a VIN based accelerometer threshold.

The vehicular telemetry hardware system 30 makes a request to the resident vehicular portion 42 and receives the vehicle identification number. The vehicular telemetry hardware system 30 creates a message with the vehicle identification number and sends the message to a remote site 44 over the telematic communications network. In this example, the remote site 44 is a server 19 that receives the message. Application software on the server 19 decodes the message to extract the vehicle identification number. The vehicle identification number is checked with the database of digital records to determine if a VIN based accelerometer threshold is available for the vehicle identification number data.

If a VIN based accelerometer threshold is in the database, then the server 19 creates a message with the VIN based accelerometer threshold and sends the message to the vehicular telemetry system 30. The vehicular telemetry hardware system 30 receives the message and decodes the message to extract the VIN based accelerometer threshold. The vehicular telemetry hardware system 30 sets the accelerometer threshold.

If a VIN based accelerometer threshold is not in the database, the application software on the server 19 determines a VIN based accelerometer threshold for the vehicle identification number. The vehicle identification number is decoded and analyzed and a VIN based accelerometer threshold is determined as previously described and a digital record is created. The server 19 creates a message with the VIN based accelerometer threshold and sends this message over the telematics communication system to the vehicular telemetry hardware system 30. The vehicular telemetry hardware system 30 receives the message and decodes the message to extract the VIN based accelerometer threshold data and sets the accelerometer threshold.

Alternatively, the remote site could be a computer 20 for decoding and analyzing the vehicle identification number and determining a VIN based accelerometer threshold.

Alternatively, the remote site could be a hand held device 22 for decoding and analyzing the vehicle identification number and determining a VIN based accelerometer threshold.

Alternatively, the decoding and analyzing of the vehicle identification number and determining a VIN based accelerometer threshold could be accomplished to the vehicular telemetry hardware system 30. In this case, the vehicle identification number and associated VIN based accelerometer threshold would be sent as a message to a remote site 44 for saving the digital record.

On Board Initiated Request VIN Based Accelerometer Threshold

Figure 8:
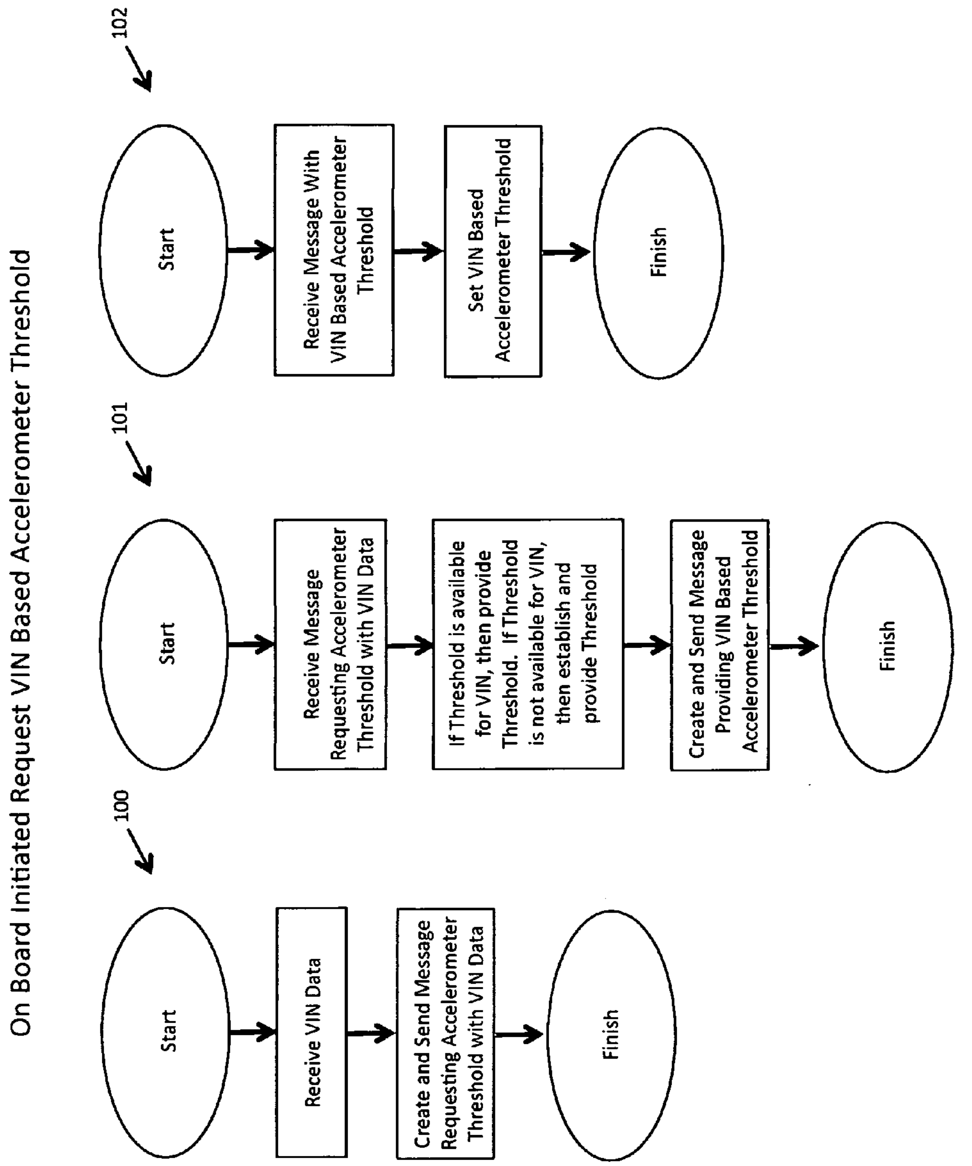
FIG. 8 is a high level flow chart for a vehicular telemetry hardware system on-board portion initiated request for a VIN based accelerometer threshold.

Referring now to FIGS. 1, 2, and 8, an on board initiated request for a VIN based accelerometer threshold is described.

The request is generally indicated at 100. The vehicular telemetry hardware system 30 receives vehicle identification number data over the interface 36 and connection 43 to the vehicle network communications bus 37. The vehicular telemetry hardware system 30 creates a message with the vehicle identification number data and sends the message to a remote site 44 requesting an accelerometer threshold.

The VIN based accelerometer threshold determination is generally indicated at 101. The remote site 44 receives the message and decodes the message to extract the vehicle identification number data. If a threshold is available for the vehicle identification number, it will be provided to the vehicular telemetry hardware system 30. If a threshold is not available, it will be determined as previously described. The remote site 44 creates a message with the VIN based accelerometer threshold and sends the message to the vehicular telemetry hardware system 30.

Setting the VIN based accelerometer threshold is generally indicated at 102. The vehicular telemetry hardware system 30 receives the message and decodes the message to extract the VIN based accelerometer threshold. The vehicular telemetry hardware system sets the accelerometer threshold.

Remote Initiated Set VIN Based Accelerometer Threshold

Figure 9:
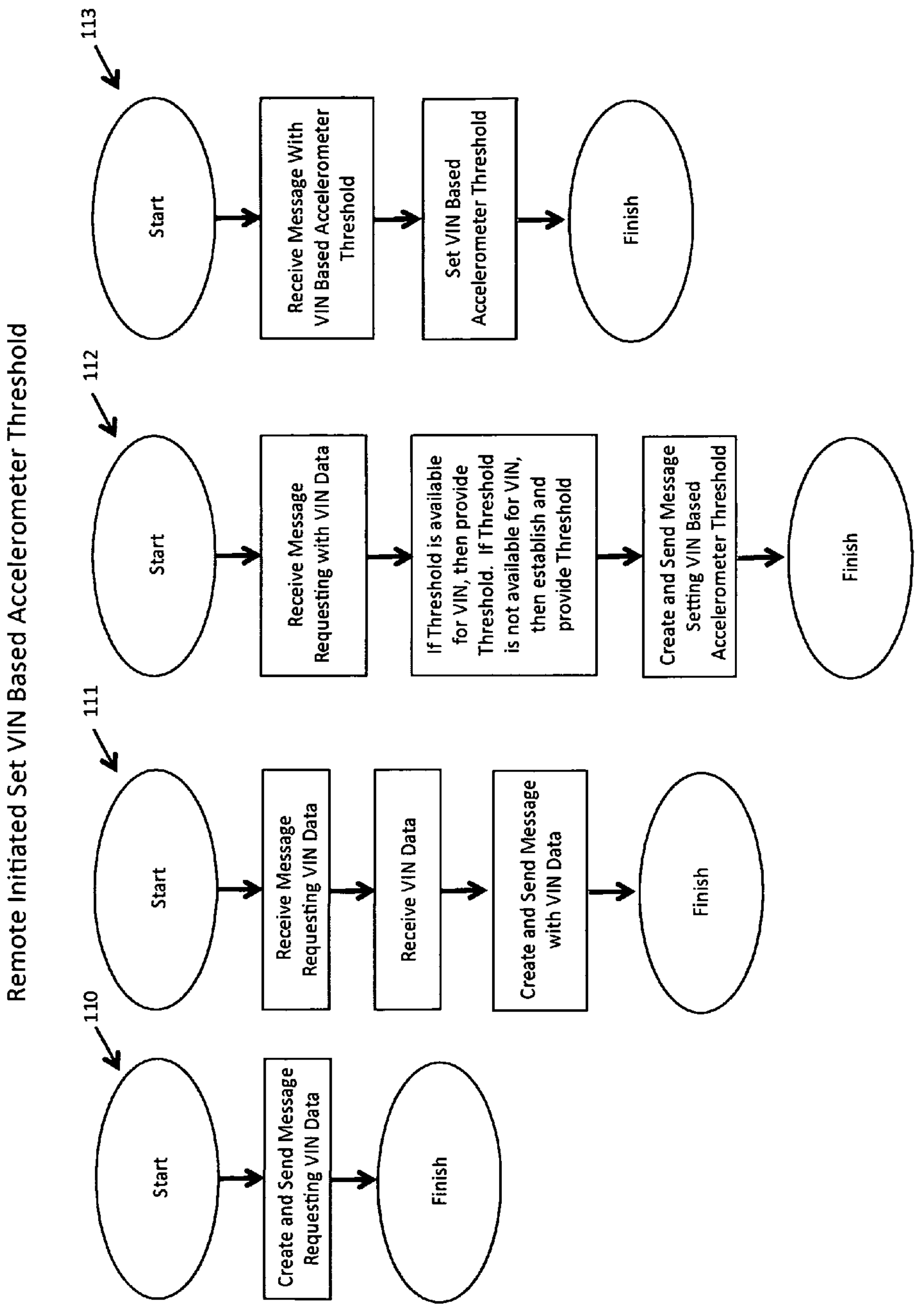
FIG. 9 is a high level flow chart for a remote initiated request to set a VIN based accelerometer threshold.

Referring now to FIGS. 1, 2, and 9, an remote initiated request for a VIN based accelerometer threshold is described.

The remote request for a vehicle identification number is generally indicated at 110. The remote site 44 creates and sends a message requesting the vehicle identification number to the vehicular telemetry hardware system 30.

Sending the vehicle identification number is generally indicated at 111. The vehicular hardware system 30 receives the message requesting the vehicle identification number and receives from the interface 36, connection 43 and vehicle network communications bus 37 the vehicle identification number data. The vehicular hardware system 30 creates a message with the vehicle identification number and sends the message to the remote site 44.

The VIN based accelerometer threshold determination is generally indicated at 102. The remote site 44 receives the message and decodes the message to extract the vehicle identification number data. If a threshold is available for the vehicle identification number, it will be provided to the vehicular telemetry hardware system 30. If a threshold is not available, it will be determined as previously described. The remote site 44 creates a message with the VIN based accelerometer threshold and sends the message to the vehicular telemetry hardware system 30.

Setting the VIN based accelerometer threshold is generally indicated at 113. The vehicular telemetry hardware system 30 receives the message and decodes the message to extract the VIN based accelerometer threshold. The vehicular telemetry hardware system sets the accelerometer threshold.

The remote initiated set VIN based accelerometer threshold may also be used in the case there the threshold has been refined to correct for either over reading or under reading providing erroneous indications of events.

Once the VIN based accelerometer threshold has been set in the vehicular telemetry hardware system 30, the DTE telemetry microprocessor 31 and firmware monitor the data from the accelerometer 34 and compare the data with the VIN based accelerometer threshold to detect and report events to the remote site 44. Alternatively, the data is logged in the system and assessed remotely at the remote site 44

Embodiments of the present invention provide one or more technical effects. More specifically, the ability for acquisition of a VIN by a vehicular telemetry hardware system to determinate a VIN based accelerometer threshold. The ability to receive and store a threshold value in a vehicular telemetry hardware system and the ability to detect an event or accident based upon a threshold value. Threshold values determined upon a VIN. Threshold values determined upon weight of a vehicle as determined by decoding the VIN. Decoding a VIN into vehicle components and associating weights with each of the vehicle components.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

What is claimed is:

1. A method of determining a VIN based accelerometer threshold for a vehicular telemetry system comprising the steps of:

receiving a VIN, decoding said VIN, determining one of a generic vehicle accelerometer threshold or a specific vehicle accelerometer threshold based upon said decoding said VIN, and establishing said VIN based accelerometer threshold as said one of a generic vehicle accelerometer threshold or a specific vehicle accelerometer threshold.

2. A method as in claim 1 wherein said decoding said VIN further decodes from said VIN a vehicle identifier field.

3. A method as in claim 2 wherein said vehicle identifier field includes at least one component of installed options, engine, or transmission.

4. A method as in claim 3 wherein a weight is associated with said at least one component.

5. A method as in claim 4 wherein said generic vehicle accelerometer threshold or said specific vehicle accelerometer threshold is associated with a sum of weight of all components.

6. A method as in claim 5 wherein sensitivity is associated with a sum of weight of said vehicle components.

7. A method as in claim 2 wherein said decoding said VIN is based upon said vehicle descriptor field and a vehicle identifier field.

8. A method as in claim 1 wherein said decoding said VIN reveals a vehicle descriptor field, said vehicle descriptor field includes at least one vehicle component of a platform, model, body style, or engine type.

9. A method as in claim 8 wherein a weight is associated with each of said at least one vehicle component.

10. A method as in claim 9 wherein said generic vehicle accelerometer threshold or said specific vehicle accelerometer threshold is associated with a sum of weight of all components.

11. A method as in claim 10 wherein sensitivity is associated with a sum of weight of all components.

12. A method as in claim 1 further including a step of saving a digital record of said VIN and said VIN based accelerometer threshold.

13. A method as in claim 12 further providing said VIN based accelerometer threshold from said digital record upon request.

14. A method as in claim 12 wherein if said accelerometer is over reading or under reading for a VIN, refine said VIN based accelerometer threshold and update said digital record of said VIN with a refined VIN based accelerometer threshold.

15. A method as is claim 1 further providing said VIN based accelerometer threshold upon request.

16. A method of setting a VIN based accelerometer threshold in a vehicular telemetry system comprising the steps of:

receiving a VIN, if a VIN based accelerometer threshold is available for said VIN, set said VIN based accelerometer threshold in said vehicular telemetry system, if a VIN based accelerometer threshold is not available for said VIN, decode said VIN determine one of a generic vehicle accelerometer threshold or a specific vehicle accelerometer threshold based upon said decode said VIN, and set said VIN based accelerometer threshold to one of a generic vehicle accelerometer threshold or a specific vehicle accelerometer threshold.

17. A method as in claim 16 wherein said decode said VIN includes determining vehicular components from a vehicle descriptor field and determining a weight of said vehicle components.

18. A method as in claim 17 wherein said generic vehicle accelerometer threshold or said specific vehicle accelerometer threshold is determined by a sum of weight of said vehicle components.

19. A method as in claim 17 wherein said decode said VIN further decodes from said VIN a vehicle identifier.

20. A method as in claim 19 wherein said vehicle identifier field includes vehicular components and determining a weight of said vehicular components.

21. A method as in claim 17 wherein said generic vehicle accelerometer threshold or said specific vehicle accelerometer threshold is based upon a range of weight of said vehicle components.

22. An apparatus for setting a VIN based accelerometer threshold in a vehicular telemetry system comprising:

a microprocessor, memory, an accelerometer, and an interface to a vehicle network communication bus, said microprocessor for communication with said accelerometer, said microprocessor for communication with said interface to said vehicle network communication bus said microprocessor and memory for receiving a VIN from said interface to a vehicle network communication bus, said microprocessor and memory determining if a VIN based accelerometer threshold is available for said VIN and capable of setting said VIN based accelerometer threshold, and said microprocessor and memory determining if a VIN based accelerometer threshold is not available for said VIN, if said VIN based accelerometer threshold is not available for said VIN, decoding said VIN, determining one of a generic vehicle accelerometer threshold or a specific vehicle accelerometer threshold based upon said decoding said VIN, and setting said VIN based accelerometer threshold to one of a generic vehicle accelerometer threshold or a specific vehicle accelerometer threshold.

23. An apparatus as in claim 22 wherein decoding said VIN reveals a vehicle descriptor field and vehicle components.

24. An apparatus as in claim 23 wherein said microprocessor and memory further capable for determining a weight of said vehicle components.

25. An apparatus as in claim 24 wherein said microprocessor and memory further capable for determining said generic vehicle accelerometer threshold or said specific vehicle accelerometer threshold is based upon a weight of said vehicle components.

26. An apparatus as in claim 25 wherein said microprocessor and memory further capable for determining said generic vehicle accelerometer threshold or said specific vehicle accelerometer threshold is based upon a range of weight of said vehicle components.

27. An apparatus as in claim 22 wherein said interface to a vehicle network communication bus is a electronic interface.

28. An apparatus as in claim 22 wherein said interface to a vehicle network communication bus is a telecommunication signal interface.

29. A method of setting a VIN based accelerometer threshold in a vehicular telemetry system comprising the steps of:

receiving VIN data in a vehicular system, creating a first message in said vehicular system and sending said first message to a remote system requesting an accelerometer threshold with said VIN data, receiving in a remote device said first message requesting an accelerometer threshold with said VIN data, if a VIN based accelerometer threshold is not available for said VIN, said remote system decoding said VIN, determining one of a generic vehicle accelerometer threshold or a specific vehicle accelerometer threshold based upon said decoding said VIN, creating a second message in said remote system and sending said second message providing one of a generic vehicle accelerometer threshold or a specific vehicle accelerometer threshold based upon said VIN data to said vehicular system, receiving said second message providing said one of a generic vehicle accelerometer threshold or a specific vehicle accelerometer threshold in said vehicular system and setting said VIN based accelerometer threshold.

30. A method as in claim 29 wherein said decoding said VIN reveals a vehicle descriptor field that includes vehicle components.

31. A method as in claim 30 wherein said decoding said VIN reveals vehicle components associated with weight.

32. A method as in claim 31 wherein said generic vehicle accelerometer threshold or said specific vehicle accelerometer threshold is determined based upon a weight of said vehicle components.

33. A method as in claim 29 wherein said remote system determines a VIN based accelerometer threshold from a digital record.

34. An apparatus for setting a VIN based accelerometer threshold in a vehicular telemetry system comprising:

a vehicular system, and a remote system, said vehicular system for receiving VIN data, said vehicular system for creating a first message and sending said first message to said remote system requesting an accelerometer threshold with said VIN data, said remote system for receiving said first message requesting an accelerometer threshold with said VIN data, if a VIN based accelerometer threshold is not available for said VIN, said remote system decoding said VIN determining one of a generic vehicle accelerometer threshold or a specific vehicle accelerometer threshold based upon said decoding said VIN, said remote system for creating a second message providing said one of a generic vehicle accelerometer threshold or a specific vehicle accelerometer threshold based upon said VIN data and sending said second message to said vehicular system, and said vehicular system for receiving said second message providing said one of a generic vehicle accelerometer threshold or a specific vehicle accelerometer threshold in said vehicular system and setting said VIN based accelerometer threshold.

35. An apparatus as in claim 34 wherein said remote system further decodes from said YIN a vehicle identifier field.

36. An apparatus as in claim 35 wherein said vehicle identifier field further includes at least one component of installed options and said remote system associates weight with said at least one component.

37. An apparatus as in claim 34 wherein said decoding said VIN reveals a vehicle descriptor field that identifies vehicular components from said VIN data.

38. An apparatus as in claim 37 wherein said vehicle components are associated with weight.

39. An apparatus as in claim 38 wherein said generic vehicle accelerometer threshold or said specific vehicle accelerometer threshold is determined based upon a sum of weight of said vehicle components.

40. An apparatus as in claim 34 wherein said remote system determines a VIN based accelerometer threshold from a digital record.

41. An apparatus as in claim 34 wherein said remote system is a server.

42. An apparatus as in claim 34 wherein said remote system is a computer.

43. An apparatus as in claim 34 wherein said remote system is a hand held system.

44. A method of setting a YIN based accelerometer threshold in a vehicular telemetry system comprising the steps of:

creating a first message in a remote system and sending said first message to a vehicular system requesting VIN data, receiving said first message in said vehicular system, said vehicular system obtaining VIN data, creating and sending a second message with VIN data to said remote system, receiving said second message with VIN data in said remote system, said remote system determining if a VIN based accelerometer threshold is not available for said VIN, said remote system decoding said VIN, determining one of a generic vehicle accelerometer threshold or a specific accelerometer threshold based upon said decoding said VIN, creating a third message in said remote system and sending said third message to said vehicular system with said one of a generic vehicle accelerometer threshold or a specific accelerometer threshold, receiving said third message with said one of a generic vehicle accelerometer threshold or a specific accelerometer threshold in said vehicular system and setting said VIN based accelerometer threshold in said vehicular system.

45. A method as in claim 44 wherein said decoding said VIN reveals a vehicle descriptor field and type of vehicle and vehicle components from said VIN data.

46. A method as in claim 45 wherein said vehicle components are associated with weight.

47. A method as in claim 46 wherein said generic vehicle accelerometer threshold or said specific vehicle accelerometer threshold is determined based upon a sum of weight of said vehicle components.

48. A method as in claim 44 further including determining in said remote system a VIN based accelerometer threshold from a digital record.

49. An apparatus for setting a VIN based accelerometer threshold in a vehicular telemetry system comprising:

a vehicular system, and a remote system, said remote system for creating a first message and sending said first message to said vehicular system requesting VIN data, said vehicular system receiving said first message, said vehicular system obtaining VIN data, for creating and for sending a second message with VIN data to said remote system, said remote system for receiving said second message with VIN data said remote system determining if a VIN based accelerometer threshold is not available for said VIN, said remote system decoding said VIN, determining one of a generic vehicle accelerometer threshold or a specific vehicle accelerometer threshold based upon said decoding said VIN, creating a third message and sending said third message to said vehicular system with said one of a generic vehicle accelerometer threshold or a specific vehicle accelerometer threshold, and said vehicular system for receiving said third message with said one of a generic vehicle accelerometer threshold or a specific vehicle accelerometer threshold and said vehicular system setting said VIN based accelerometer threshold.

50. An apparatus as in claim 49 wherein said remote system determines vehicle components from said decoding said VIN.

51. An apparatus as in claim 50 where said vehicle components are associated with weight.

52. An apparatus as in claim 51 wherein said generic vehicle accelerometer threshold or said specific vehicle accelerometer threshold is determined based upon a weight of said vehicle components.

53. An apparatus as in claim 49 within said remote system further determines a VIN based accelerometer threshold from a digital record.

54. An apparatus as in claim 49 wherein said remote system is a server.

55. An apparatus as in claim 49 wherein said remote system is a computer.

56. An apparatus as in claim 49 wherein said remote system is a hand held device.

* * * * *